(12) United States Patent
Chen

(10) Patent No.: US 10,516,339 B2
(45) Date of Patent: Dec. 24, 2019

(54) POWER CONVERTER HAVING A DIFFERENTIAL DETERMINATION WITH SECONDARY CURRENT SENSOR

(71) Applicant: Telefonaktiebolaget LM Ericsson (publ), Stockholm (SE)

(72) Inventor: Geng Chen, Shanghai (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/090,624

(22) PCT Filed: Apr. 6, 2016

(86) PCT No.: PCT/CN2016/078542
§ 371 (c)(1),
(2) Date: Oct. 2, 2018

(87) PCT Pub. No.: WO2017/173603
PCT Pub. Date: Oct. 12, 2017

(65) Prior Publication Data
US 2019/0115842 A1 Apr. 18, 2019

(51) Int. Cl.
*H02M 1/00* (2006.01)
*H02M 3/335* (2006.01)
*H02M 3/337* (2006.01)

(52) U.S. Cl.
CPC ......... *H02M 3/33569* (2013.01); *H02M 1/00* (2013.01); *H02M 3/3376* (2013.01);
(Continued)

(58) Field of Classification Search
CPC ............... H02M 1/08; H02M 3/33546; H02M 3/33538; H02M 3/33515; H02M 3/33576;
(Continued)

(56) References Cited

U.S. PATENT DOCUMENTS 6,477,064 B1   11/2002  Weng et al.
9,257,913 B1 *  2/2016  McDonald ........ H02M 3/33569
(Continued)

FOREIGN PATENT DOCUMENTS

CN   101425751 A   5/2009
CN   102446620 A   5/2012
JP     3175388 B2   6/2001

OTHER PUBLICATIONS

PCT International Search Report for International application No. PCT/CN2016/078542—dated Jan. 11, 2017.
(Continued)

*Primary Examiner* — Yusef A Ahmed
*Assistant Examiner* — Bryan R Perez
(74) *Attorney, Agent, or Firm* — Sage Patent Group

(57) ABSTRACT

A power converter including a transformer (Tr) with a primary and a secondary, and a capacitor (Cr) and an inductor (Lr) serially connected with the primary of the transformer. The capacitor, the inductor and a magnetizing inductor (Lm) of the transformer form an LLC resonant circuit. The power converter further including a first current sensor (CT1) and a second current sensor (CT2). The first current sensor including the inductor and is configured to sense, via the inductor, a current passing through the primary of the transformer. The second current sensor including the primary and is configured to sense, via the primary, a current passing through the magnetizing inductor of the transformer. A current passing through the secondary is determined from a difference obtained based on the sensed current passing through the primary of the transformer and the sensed current passing through the magnetizing inductor. The power converter has the advantage that it is possible to provide an accurate sensed current at a low cost without load limitation, and it is also possible to perform a cycle-by-cycle protection function since a load waveform can be restored.

(Continued)

In addition, another power converter is also provided, which has a structure for reducing power circulation among parallel windings (Wa, Wb) of the transformer.

6 Claims, 5 Drawing Sheets

(52) U.S. Cl.
CPC ............... *H02M 2001/0009* (2013.01); *H02M 2001/0058* (2013.01); *Y02B 70/1433* (2013.01); *Y02B 70/1491* (2013.01)

(58) Field of Classification Search
CPC ......... H02M 3/33553; H02M 3/33523; H02M 3/3353; H02M 3/33569; H02M 1/00; H02M 2001/0058; H02M 2001/0009; Y02B 70/1491; Y02B 70/1433
USPC .......................................... 363/15–17, 97–98
See application file for complete search history.

(56) References Cited

U.S. PATENT DOCUMENTS

| | | |
|---|---|---|
| 2013/0163290 A1 | 6/2013 | Moon et al. |
| 2014/0362616 A1 | 12/2014 | An |
| 2015/0124489 A1* | 5/2015 | Dai ...................... H02M 3/335 363/17 |

OTHER PUBLICATIONS

Extended European Search Report dated Oct. 11, 2019 for European Patent Application No. 16897538.1, 7 pages.

* cited by examiner

POWER CONVERTER HAVING A DIFFERENTIAL DETERMINATION WITH SECONDARY CURRENT SENSOR

PRIORITY

This nonprovisional application is a U.S. National Stage Filing under 35 U.S.C. § 371 of International Patent Application Serial No. PCT/CN2016/078542 filed Apr. 6, 2016 and entitled "POWER CONVERTER" which is hereby incorporated by reference in its entirety.

TECHNICAL FIELD

The non-limiting and exemplary embodiments of the present disclosure generally relate to the technical field of electronic power conversion, and specifically to power converters.

BACKGROUND

This section introduces aspects that may facilitate better understanding of the disclosure. Accordingly, the statements of this section are to be read in this light and are not to be understood as admissions about what is in the prior art or what is not in the prior art.

Nowadays, power converters are widely used in various fields. The power converters include many types. For example, based on their inputs and outputs, they can be classified into Direct Current to Direct Current (DC/DC) converters, Direct Current to Alternative Current (DC/AC) converters, Alternative Current to Direct Current (AC/DC) converters, and Alternative Current to Alternative Current (AC/AC) converters.

Particularly, DC/DC converters can be found in many application scenarios, for example, in data centers of communication systems. A DC/DC converter usually includes an input conversion circuit, such as a bridge circuit, an output rectifying circuit and an output filtering circuit. For an isolated DC/DC converter, it further includes a transformer connected between the input conversion circuit and the output rectifying circuit to provide isolation therebetween. Inductor-Inductor-Capacitor (LLC) topology is a serial resonant circuit and it was proposed for use in DC/DC converters mainly since it can achieve soft switching in the converters.

Due to space limitation and miniaturization requirements, power density of a power converter is constantly increasing and thus the current output thereof is increased substantially. In such a case, it is difficult to perform current sensing with traditional current sensing solutions. For example, one possible current sensing solution is to use a sampling resistor to sense the current. However, this solution has several drawbacks, such as low accuracy, large power loss, etc. At the same time, it requires additional temperature compensation since impendence of the sampling resistor is sensitive to temperature, which may influence the accuracy of current sensing. Another possible solution is to use a current transformer (CT) at the primary or the secondary of the converter to sense the current. For the purpose of illustration, FIG. 1 illustrates an example DC/DC converter with the LLC topology and a current sense structure in the existing solution.

As illustrated in FIG. 1, the example DC/DC converter 100 includes an input conversion circuit in a form of a bridge circuit, a transformer Tr with a primary and a secondary, an output rectifying circuit including diodes D1, D2, and an output filtering circuit including a capacitor Co, wherein the transformer Tr is connected between the input conversion circuit and the output rectifying circuit. The bridge circuit is formed by switches S1, S2, S3 and S4 connected in a full bridge topology. The DC/DC converter 100 further comprises a capacitor Cr and an inductor Lr, both of which are serially connected with the primary of the transformer Tr and thus form an LLC circuit together with a magnetizing inductor Lm of the primary. In order to sense the current, a current transformer CT is serially connected with the primary of the transformer Tr. The CT senses, by means of its primary Lsm serially connected with the primary, the current passing through the primary of the transformer Tr and generates a signal at its secondary Lss based on the current passing through the primary of the transformer Tr. The sensed current is integrated to obtain the integrated current, which is used to characterize the current passing through the secondary of the CT. However, this solution requires an additional sense transformer, which introduces more space, more power loss, more cost and at the same time it also involves issues such as low accuracy and load limitation. Moreover, due to the low accuracy, load waveform cannot be restored and in such a case, it is hard to achieve a cycle-by-cycle protection function, which however is desired in many power converter applications.

In addition, with the increasing of the power density of the power converter, another structure was also proposed for the power converter, which adopts parallel windings for the transformer. The use of parallel windings can decrease direct current resistance (DCR) so as to decrease winding loss and thus achieve better performance. Mostly, the parallel windings use the same via holes and are distributed to different Printed Circuit Board (PCB) layers, but sometimes the parallel windings are distributed in the same PCB layer or around different transformer legs. In such a case, it is hard to ensure exactly the same parallel windings and a mismatch among the windings may occur. Such mismatch may cause a power circulation among the parallel windings, which means an extra power loss. Moreover, the power circulation may lead to more voltage and current stress to power train devices. In addition, the mismatch may also increase the primary current and secondary root mean square (RMS) value and thus induce a conduction loss of a power switch, such as Metallic Oxide Semiconductor Field Effect Transistor (MOSFET), Insulated Gate Bipolar Transistor (IGBT), etc., and more winding loss of magnetic components, which may in turn generate more power dissipation of the power converter.

In an existing solution, it is proposed to use an additional capacitor in the power converter to reduce magnetic flux unbalance. For the purpose of illustration, FIG. 2 illustrates an example DC/DC converter with parallel windings in an existing solution. As illustrated in FIG. 2, the DC/DC converter 200 is similar to that as illustrated in FIG. 1 in most parts. Differences lie in that the output filtering circuit further includes an inductor Lo in addition to the capacitor Co, which is a typical output filtering circuit for hard switching, and that the DC/DC converter does not use the LLC topology but use parallel windings for the transformer Tr, while a capacitor Ca is serially connected with the primary of the transformer Tr. The use of the capacitor Ca can tackle the magnetic flux unbalance since it can eliminate accumulation of magnetic flux difference of the transformer, but it cannot eliminate the power circulation of parallel windings and problems associated therewith.

SUMMARY

Various embodiments of the present disclosure mainly aim at providing a power converter with, for example, a more accurate and efficient current sensing capability and/or a power circulation reduction capability. Other features and advantages of embodiments of the present disclosure will also be understood from the following description of specific embodiments when read in conjunction with the accompanying drawings, which illustrate, by way of example, the principles of embodiments of the present disclosure.

In a first aspect of the present disclosure, there is provided a power converter. The power converter comprises a transformer with a primary and a secondary. The power converter also comprises a capacitor and an inductor serially connected with the primary of the transformer. The capacitor, the inductor and a magnetizing inductor of the primary of the transformer form an LLC resonant circuit. The power converter further comprises a first current sensor and a second current sensor. The first current sensor comprises the inductor and is configured to sense, via the inductor, a current passing through the primary of the transformer. The second current sensor comprises the primary and is configured to sense, via the primary, a current passing through the magnetizing inductor of the primary of the transformer. A signal characterizing a current passing through the secondary is determined from a difference obtained based on the sensed current passing through the primary of the transformer and the sensed current passing through the magnetizing inductor.

In one embodiment of the present disclosure, the power converter may further comprise a first integrator and a second integrator. The first integrator is configured to integrate the sensed current passing through the primary of the transformer to obtain a first integrated current signal. The second integrator is configured to integrate the sensed current passing through the magnetizing inductor of the primary of the transformer to obtain a second integrated current signal.

In another embodiment of the present disclosure, the power converter may further comprise a difference determining element. The difference determining element is configured to determine a difference between the first integrated current signal and the second integrated current signal so that the signal characterizing the current passing through the secondary can be obtained based on the determined difference.

In a further embodiment of the present disclosure, an output terminal of the second integrator may be connected to a reference terminal of the first integrator so that the first integrator may provide a difference between the first integrated current signal and the second integrated current signal.

In a yet further embodiment of the present disclosure, the power converter may further comprise a rectifier for rectifying the difference between the first integrated current signal and the second integrated current signal.

In another embodiment of the present disclosure, the primary may include at least a first winding and a second winding connected in parallel. In this embodiment, the first winding is serially connected with a first capacitor and the second winding is serially connected with a second capacitor.

In a further embodiment of the present disclosure, the first capacitor and the second capacitor may function together as the capacitor for forming an LLC resonant circuit.

According to the first aspect and embodiments as described above, at least part of the following advantages can be achieved. The current flowing through the primary can be sensed by reusing the inductor in the LLC circuit, while the current passing through the magnetizing inductor can be sensed by reusing the primary of the transformer. A difference obtained based on the two sensed currents can be used to determine the current passing through the secondary. Since the sensing of currents is performed by reusing components already contained in the power converter, space, cost and power loss can be reduced. In addition, due to the reusing components already contained in the power converter, there is no magnetic flux saturation risk, even for a large load. Moreover, since the obtained difference can reflect the current passing through the secondary more accurately, the load waveform passing through the secondary can be restored more ideally and a higher accuracy can be achieved, even for a light load. Furthermore, the cycle-by-cycle function can be performed accordingly based on the determined current passing through the secondary.

In a second aspect of the present disclosure, there is provided another power converter. The power converter comprises a transformer with a primary and a secondary. The primary includes at least two parallel windings. The power converter also comprises at least two capacitors. At least two of the parallel windings are connected, respectively, in series to different capacitors of the at least two capacitors.

In an embodiment of the present disclosure, the power converter may further comprise an inductor serially connected with the primary of the transformer. The inductor, magnetizing inductors of the at least two parallel windings of the transformer and the at least two capacitors serially connected thereto may form an LLC resonant circuit.

In another embodiment of the present disclosure, each of the at least two parallel windings comprised in the power converter is serially connected to a different one of the at least two capacitors.

According to the second aspect and embodiments as describe above, at least part of the following advantages can be achieved. For the primary with at least two parallel windings, the at least two parallel windings can be serially connected with different ones of at least two capacitors respectively. Thus, even if there is a mismatch between the parallel windings, energy will be exchanged only between the serially connected capacitors and will not generate undesired power circulation. Furthermore, it will not cause the primary current and secondary RMS value increasing and thereby the converter efficiency can be improved. In the meanwhile, it can also tackle the magnetic flux unbalance issue, since it can eliminate accumulation of magnetic flux difference of the transformer too.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or signs are used to designate like or equivalent elements. The drawings are illustrated for facilitating better understanding of the embodiments of the disclosure and not necessarily drawn to scale, in which.

DETAILED DESCRIPTION

Figure 1:
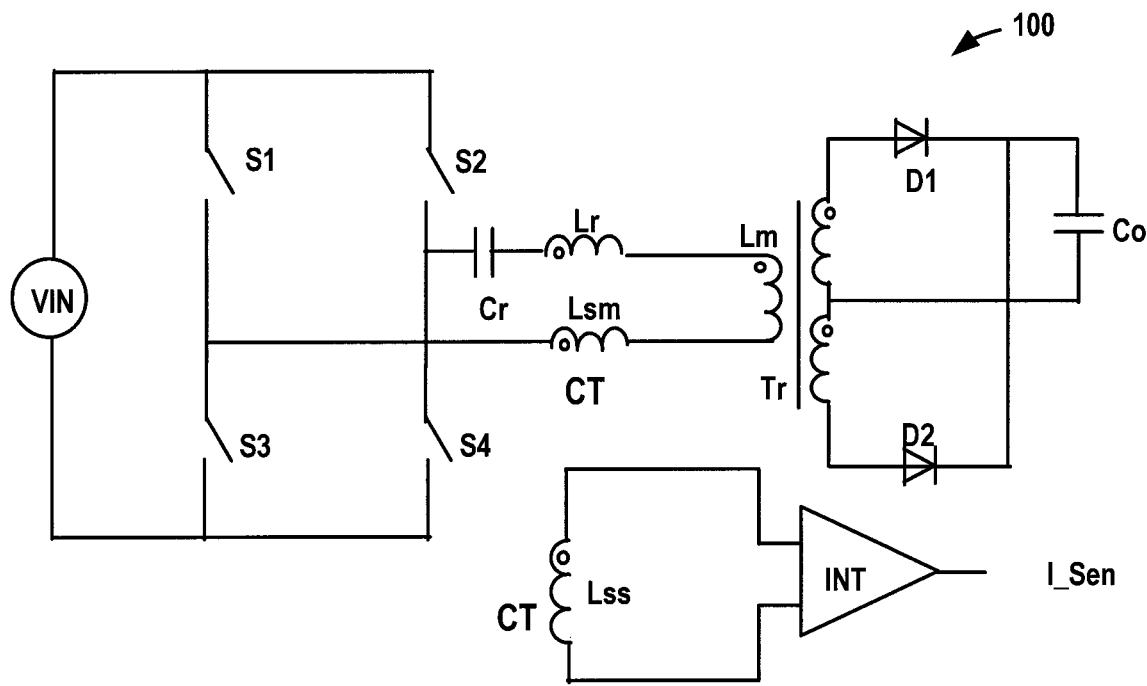
FIG. 1 illustrates a diagram of an example DC/DC converter with LLC topology and a current sense structure in an existing solution.

Hereinafter, the principle and spirit of the present disclosure will be described with reference to illustrative embodiments. It shall be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. It will be also understood that the terms "connect(s)," "connecting", "connected", etc. when used herein, just means that there is an electrical connection between two elements and they can be connected either directly or indirectly, unless explicitly stated to the contrary.

In the following description and claims, unless defined otherwise, all technical and scientific terms used herein have the same meaning as commonly understood by one of ordinary skills in the art to which this disclosure belongs. For example, the term "power converter" used herein may refer to an electrical device converting electric energy from one form to another, for example, converting between AC and DC, or just changing the voltage or frequency, or some combination of these. The power converter may be a simple transformer to change a voltage of the electrical power, but it may also include a more complex system. The term "primary current" used herein means the current passing through the primary of a transformer and "secondary current" used herein means the current passing through the secondary of the transformer. The "output current" means the current output to a load and thus is also called as "load current". Hereafter, the terms "primary current" and "the current passing through the primary of a transformer" may be used interchangeably; the terms "the secondary current" and "the current passing through the secondary" may be used interchangeably; and the terms "output current" and "load current" may be used interchangeably.

Figure 3:
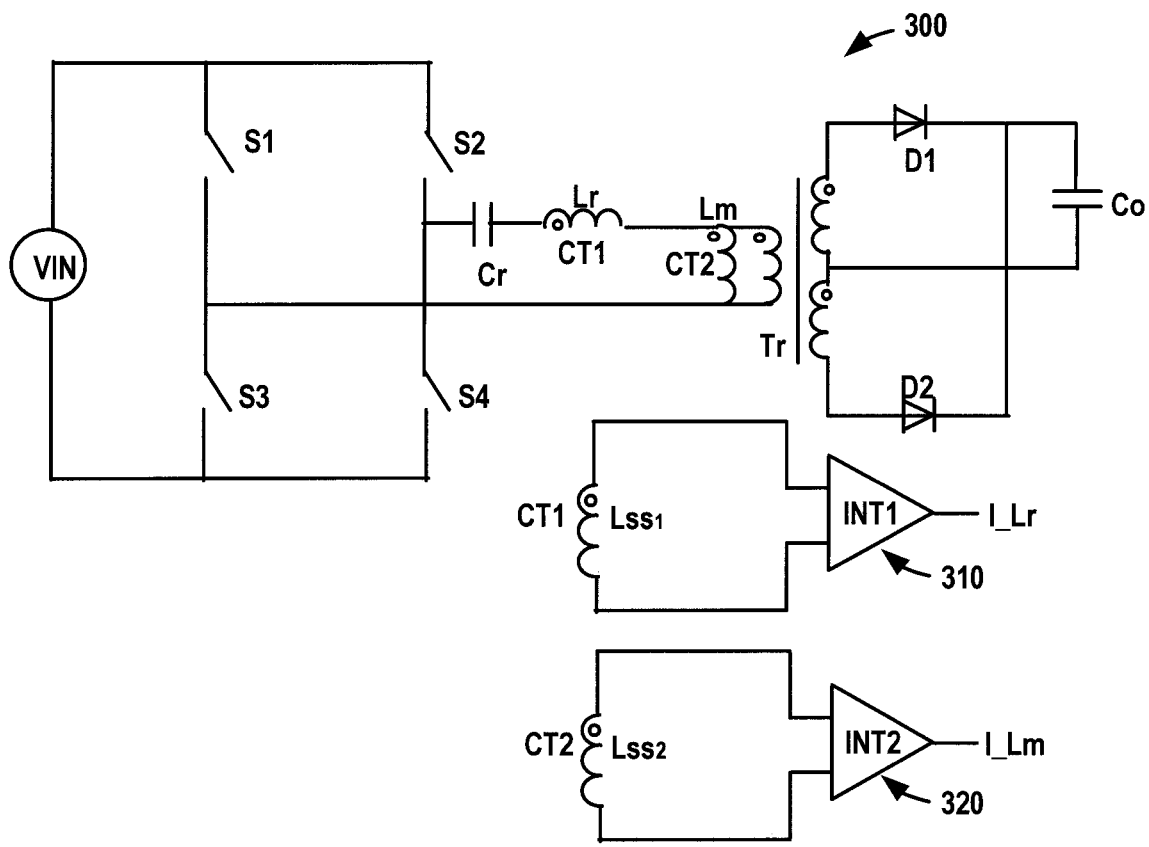
FIG. 3 illustrates a diagram of an example DC/DC converter with a new current sense structure according to an embodiment of the present disclosure.

Hereinafter, reference will be first made to FIG. 3 to describe an example DC/DC converter with a new current sense structure according to an embodiment of the present disclosure. However, it should be appreciated that FIG. 3 is given for illustration purposes and the present disclosure is not limited thereto. The DC/DC converter is only an example of the power converter as described herein. Ideas and principles proposed herein can also be applied to any other power converter with a transformer and a LCC circuit.

As illustrated in FIG. 3, the DC/DC converter 300 includes an input conversion circuit in a form of a bridge circuit. The bridge circuit is formed by switches S1, S2, S3 and S4 connected in a full bridge topology. The bridge circuit receives an input DC voltage from a source VIN and converts the input voltage into a square wave. It shall be appreciated that the bridge circuit is an example of the conversion circuit and the present disclosure is not limited thereto. It is also possible to use another form of input conversion circuit to perform input conversion. The bridge circuit is not limited to the full bridge topology. For example, it may use a half bridge topology. The switches may be of other types, like MOSFET, IGBT, and so on.

The DC/DC converter 300 also includes a transformer Tr with a primary and a secondary. The transformer Tr has its primary connected to the bridge circuit and its secondary connected with a rectifying circuit. The transformer may generate a current at its secondary based on a current passing through its primary and provide isolation between the bridge circuit and the rectifying circuit.

The output rectifying circuit contains diodes D1, D2, which rectifies the current at the secondary and provides a rectified voltage signal. The DC/DC converter 300 further includes an output filtering circuit including a capacitor Co, which provides a filtered voltage signal. A load can be connected in parallel with the capacitor Co. It shall be noticed that the output rectifying circuit and the output filtering circuit are illustrated for the purpose of illustration and the present disclosure is not limiter thereto. It is possible to use another form of output rectifying circuit or output filtering circuit. For example, the output rectifying circuit may comprise rectifying devices of other types, like MOSFETs, IGBTs and so on, instead of diodes. The output filtering circuit may include additional elements like an additional inductor.

In addition, the DC/DC converter further includes a first current sensor in the form of a current transformer CT1 and a second current sensor in the form of another current transformer CT2. As an example, the current transformer CT1 may contain the inductor Lr as its primary and a winding Lss$_1$ as its secondary. The current transformer CT1 is configured to sense, via the inductor Lr, a current passing through the primary of the transformer Tr. The current transformer CT2 may include the primary of the transformer Tr as its primary and a winding Lss$_2$ as its secondary. The current transformer CT2 is configured to sense, via the primary, a current passing through a magnetizing inductor Lm of the transformer Tr. A difference obtained based on the sensed current passing through the primary of the transformer (Tr) and the sensed current passing through the magnetizing inductor Lm is to be used to determine a signal characterizing a current passing through the secondary.

The primary of the transformer Tr per se may be a winding, which is not ideal in practice. An unideal winding may be equivalent to a magnetizing inductor and an ideal winding connected in parallel. That is to say, the primary of the transformer Tr can be taken as a combination of the magnetizing inductor Lm and an ideal winding. Thus, for ease of description, the primary of the transformer Tr in FIG. 3 is illustrated as including the magnetizing inductor Lm and the idea winding, which is an equivalent circuit of the primary. However, it should be understood that the primary or winding of the transformer may be a single component physically. In view of this equivalent circuit, the current passing through the inductor Lr (i.e., the primary current, or the current passing through the primary) is a sum of a current passing through the ideal winding and a current passing through the magnetizing inductor Lm. Therefore, the difference between the sensed current passing through the primary and the sensed current from the magnetizing inductor Lm is the current passing through the ideal winding. Meanwhile, the secondary current, i.e. the current passing through the secondary, is only dependent on the current passing through the ideal winding. Thus, the difference obtained based on the sensed current passing through the primary of the transformer Tr and the sensed current passing through the magnetizing inductor Lm can be used to obtain an ideal characterization for the secondary current. Due to reusing the components already contained in the power converter, e.g. the inductor Lr and the primary of the transformer, there is no magnetic flux saturation risk, even for a large load. Moreover, since the obtained difference can reflect the current passing through the secondary more accurately, the load waveform passing through the secondary can be restored and a higher accuracy can be achieved, even for a light load. Furthermore, the cycle-by-cycle function can be performed based on the determined current passing through the secondary.

The DC/DC converter 300 may further comprise a first integrator INT1 310 and a second integrator INT2 320 as illustrated in FIG. 3. The first integrator INT1 310 is configured to integrate the sensed current passing through the primary of the transformer Tr to obtain a first integrated current signal I_Lr. The second integrator INIT2 320 is configured to integrate the sensed current passing through the magnetizing inductor Lm of the transformer Tr to obtain a second integrated current signal I_Lm. In an embodiment of the present disclosure, the first integrated current signal I_Lr and the second integrated current signal I_Lm can be expressed by the following equations (1) and (2) respectively:

$$I_{Lr} = \int \frac{Lr \cdot di_{Lr}}{N1 \cdot dt} dt \tag{1}$$

$$I_{Lm} = \int \frac{Lm \cdot di_{Lm}}{N2 \cdot dt} dt \tag{2}$$

wherein $I_{Lr}$ denotes the first integrated current signal I_Lr; Lr denotes the inductance of the inductor Lr; N1 denotes the turn ratio of the CT1; $i_{LL}$ denotes the current passing through the primary; $I_{Lm}$ denotes the second integrated current signal I_Lm; Lm denotes the inductance of the magnetizing inductor Lm of the primary; N2 denotes the turn ratio of the CT2; $i_{Lm}$ denotes the current passing through the magnetizing inductor Lm.

It shall be understood that although in FIG. 3, the DC/DC converter 300 is illustrated as including two integrators INT1 and INT2, the DC/DC converter 300 may not incorporate them as their components, since another separate circuit or device, which will use the secondary current, may include the two integrators to integrate the sensed currents from the two current transformers CT1, CT2.

Figure 4:
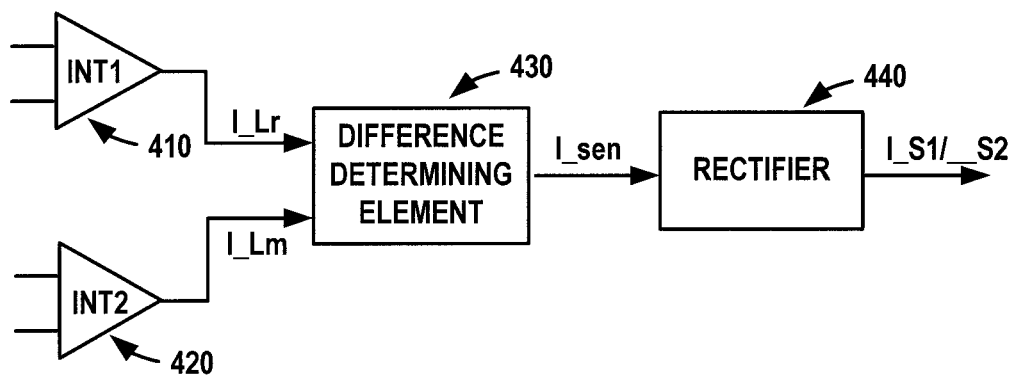
FIG. 4 schematically illustrates a diagram for processing sensed current signals according to an embodiment of the present disclosure.

FIG. 4 schematically illustrates a diagram for processing of sensed current signals according to an embodiment of the present disclosure. As illustrated in FIG. 4, in addition to the first and second integrators INT1 410, INT2 420, the DC/DC converter may further include a difference determining unit 430. The first and second integrated currents I_Lr, I_Lm can be provided to the difference determining unit 430 to determine a difference between I_Lr and I_Lm, based on which the signal characterizing the current passing through the secondary can be obtained. The difference determining unit 430 may be, for example, a differential amplifier, or some other elements which can be used to determine the difference between the first and second integrated currents I_Lr and I_Lm. The difference I_sen can be expressed by:

$$I_{sen} = I\_Lr - I\_Lm \tag{3}$$

wherein $I_{sen}$ indicates the signal characterizing the secondary current.

Figure 5:
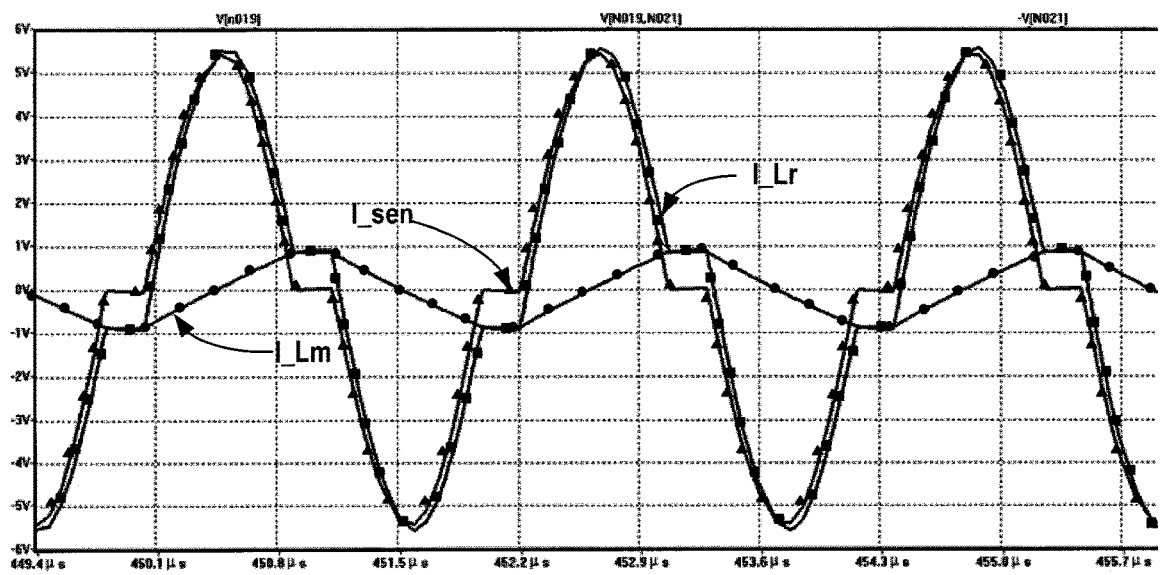
FIG. 5 illustrates example waveforms of the integrated currents for two current transformers and the signal characterizing the secondary current according to an embodiment of the present disclosure.

For a purpose of illustration, FIG. 5 illustrates example waveforms of the sensed currents by two current transformers and the signal characterizing the secondary current according to an embodiment of the present disclosure. As illustrated in FIG. 5, a waveform denoted by a line with black squares denotes the first integrated current I_Lr; the waveform denoted by a line with black circles denotes the second integrated current I_Lm; and the waveform denoted by a line with black triangles denotes the difference I_sen. From these illustrated waveforms, it is clear that the current I_sen is the difference between the first and second integrated currents I_Lr and I_Lm. It shall be understood that the DC/DC converter may not incorporate the difference determining element 430, since another separate circuit or device, which will use the secondary current, may include this element to determine the difference I_sen.

This difference I_sen may be used as the signal characterizing the current passing through the secondary directly. Alternatively, the difference I_sen may be subject to further processing. As illustrated in FIG. 4, the DC/DC converter may further include a rectifier 440. The rectifier 440 may be used to rectify the difference I_sen between the first integrated current signal I_Lr and the second integrated current signal I_Lm. The rectifier 440 may be any suitable rectifying device, such as a transistor like MOSFET, IGBT, and so on.

Figure 6:
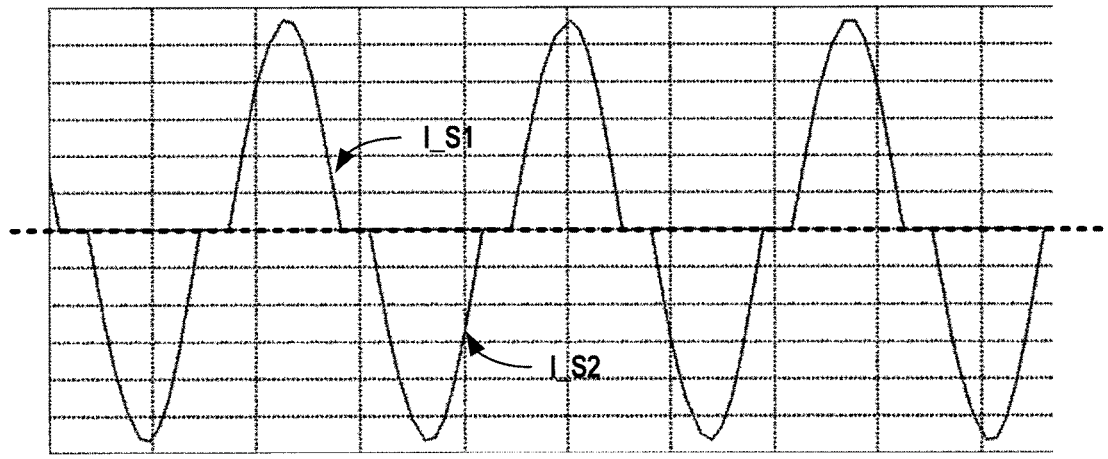
FIG. 6 illustrates a diagram of rectified signals according to an embodiment of the present disclosure.

For illustration purposes, FIG. 6 illustrates a diagram of rectified signals from the rectifier 440 according to an embodiment of the present disclosure. As illustrated in FIG. 6, the illustrated waveform denotes the difference I_sen. The upper part I_S1 with a positive amplitude may characterize the current passing through a secondary winding of the transformer in a half switching period, while the lower part I_S2 with a negative amplitude may characterize the current passing the secondary winding of the transformer in the other half switching period. After rectifying, it is possible to obtain any of the two parts, for example LS_1, which may be used by another circuit or device to, for example, perform a control operation based thereon. It shall be understood that the DC/DC converter may not incorporate the rectifier, since another circuit or device, which will use the secondary current, may include this rectifier to rectify the difference I_sen.

Figure 7:
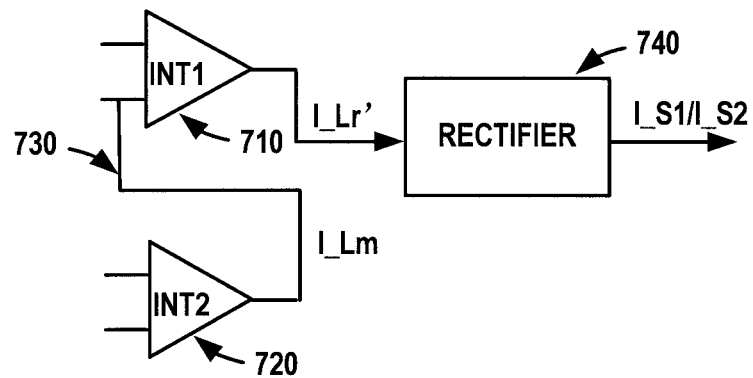
FIG. 7 schematically illustrates a diagram for processing sensed current signals according to another embodiment of the present disclosure.

FIG. 7 schematically illustrates a diagram for processing of sensed current signals according to another embodiment of the present disclosure. In FIG. 7, integrators INT1 710 and INT2 720 and rectifier 740 are similar to those as illustrated in FIG. 4. Differences lie in that an output terminal of the integrator INT2 720 is connected to a reference terminal of the integrator INT1 710 and that it does not contain a difference determining element. The integrators 710 and 720 operate based on their respective reference signals. Specially, the integrator 710 comprises a signal input terminal for receiving an input signal, a reference terminal at which a reference signal is provided and an output terminal at which an integral signal is provided by integrating the difference between the input signal and the reference signal. The integrator 720 has the similar structure and function. Thus, if the output I_Lm of the integrator INT2 720 is set as the reference signal for the INT1 710, the integrated current I_Lr' from the integrator INT1 710 will be a difference I_sen between the first integrated current signal I_Lr and the second integrated current signal I_Lm. Therefore, by means of such a connection, no additional difference determining element is required. It shall be understood that the DC/DC converter may not incorporate the integrators INT1 710, INT2 720, and rectifier 740, since another separate circuit or device, which will use the secondary current, may include these components.

It shall be understood that although in FIGS. 3, 4 and 7, it describes embodiments where at least one of the integrated currents is first obtained and in turn their difference is determined, the present disclosure is not limited thereto. In fact, it is also possible to first determine the difference between the sensed current from the primary of the transformer Tr and the sensed current from the magnetizing inductor of the primary and then integrate the difference to obtain the signal characterizing the current passing through the secondary.

It shall also be understood that although the transformer described above has a single winding structure, the present disclosure is not limited thereto. The transformer may have other structures, like a parallel winding structure. In such a case, it is possible to detect respective currents passing through respective magnetizing inductors of the parallel windings and the current I_sen can be determined based on the difference obtained from the sensed current from the primary of the transformer Tr and a sum of the respective currents passing through the respective magnetizing inductors. Alternatively, since there is a predetermined relationship among the parallel windings usually, it is possible to sense only one of the respective currents passing through the respective magnetizing inductors and other currents can be determined based on the sensed current and the predetermined relationship.

In addition, there is also provided a solution for another power converter with parallel windings, which will be described hereinafter with reference to FIGS. 8 to 10.

Figure 8:
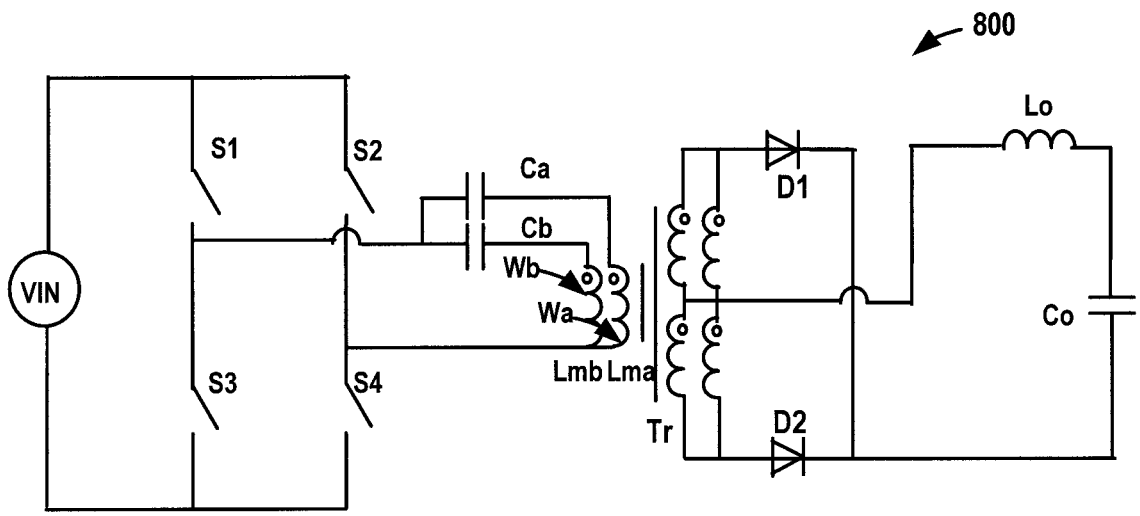
FIG. 8 illustrates a diagram of an example DC/DC converter with parallel windings according to an embodiment of the present disclosure.

FIG. 8 further illustrates a diagram of an example DC/DC converter with parallel windings according to an embodiment of the present disclosure. As illustrated in FIG. 8, the DC/DC converter 800 includes an input conversion circuit in a form of a bridge circuit. The bridge circuit is formed by switches S1, S2, S3 and S4, like diodes, MOSFETs, IGBTs, and so on, connected in a full bridge topology. The bridge circuit receives an input DC voltage from a source VIN and converts the input voltage into a square wave. It shall be appreciated that the bridge circuit is an example of the conversion circuit and the present disclosure is not limited thereto. For example, it is also possible to use another form of input conversion circuit to perform input conversion. The bridge circuit is not limited to the full bridge topology. For example, the bridge circuit may use a half bridge topology. The switches may be of other types like MOSFET, IGBT, and so on.

The DC/DC converter 800 also includes a transformer Tr with a primary and a secondary. The transformer Tr has its primary connected to the bridge circuit and its secondary connected with a rectifying circuit. Especially, the transformer Tr adopts at least two parallel windings. As an example, in FIG. 8, the primary has a primary with two windings Wa, Wb connected in parallel. The secondary has two secondary windings, each of which has two windings connected in parallel. It shall be appreciated that the number of primary or secondary windings is illustrative. More primary or secondary windings may be used.

The output rectifying circuit contains diodes D1, D2, which rectifies the current at the secondary and provides rectified voltage signals. The DC/DC converter 800 further includes an output filtering circuit including a capacitor Co and an inductor Lo, which may provide filtered voltage signals. A load can be connected in parallel with the capacitor Co. It shall be noticed that the output rectifying circuit and the output filtering circuit are illustrated for the purpose of illustration and the present disclosure is not limiter thereto. It is possible to use another form of output rectifying circuit or output filtering circuit. For example, the output rectifying circuit may comprise rectifying devices of other types like MOSFETs, IGBTs and so on, instead of diodes. The output filtering circuit may include more or less elements.

In order to reduce the power circulation among the parallel windings, especially for the primary, the DC/DC converter 800 may further comprise at least two capacitors, e.g. Ca and Cb. Particularly, at least two of the parallel windings are connected, respectively, in series to different capacitors of the at least two capacitors. Preferably, all of the parallel windings comprised in the DC/DC converter 800 are connected, respectively, in series to different capacitors of the at least two capacitors. For example, the capacitor Ca is connected to the winding Wa of the two parallel windings and the capacitor Cb is connected to the winding Wb of the two parallel windings.

Figure 2:
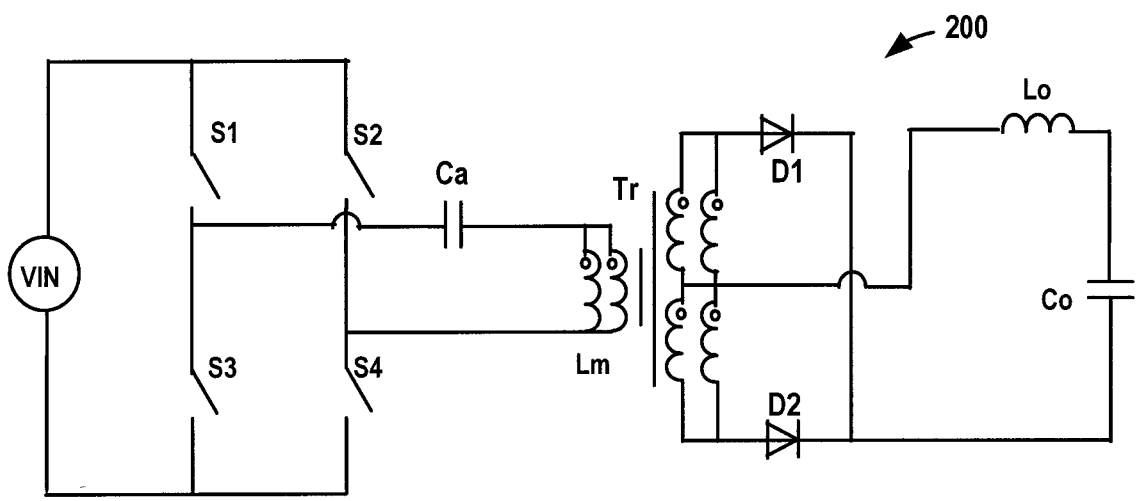
FIG. 2 illustrates a diagram of an example DC/DC converter with parallel windings in an existing solution.

As introduced in the Background section, when there is a mismatch between the two parallel windings, it may cause a voltage difference; if there are no capacitors, a power circulation would have been generated due to the voltage difference. Due to the capacitors Ca and Cb, the voltage difference will cause the capacitor Ca to be charged and the capacitor Cb to be discharged or cause the capacitor Ca to be discharged and the capacitor Cb to be charged, which is dependent on the sign of the voltage difference. Accordingly, energy will be exchanged between the two capacitors and will not generate undesired power circulation. Since there is not power circulation between the windings Wa and Wb, it will not cause the primary current and secondary RMS value increasing. In the meanwhile, it can also tackle the magnetic flux unbalance issue as mentioned with reference to the DC/DC 200 in FIG. 2, since it can eliminate accumulation of magnetic flux difference of the transformer too.

Figure 9:
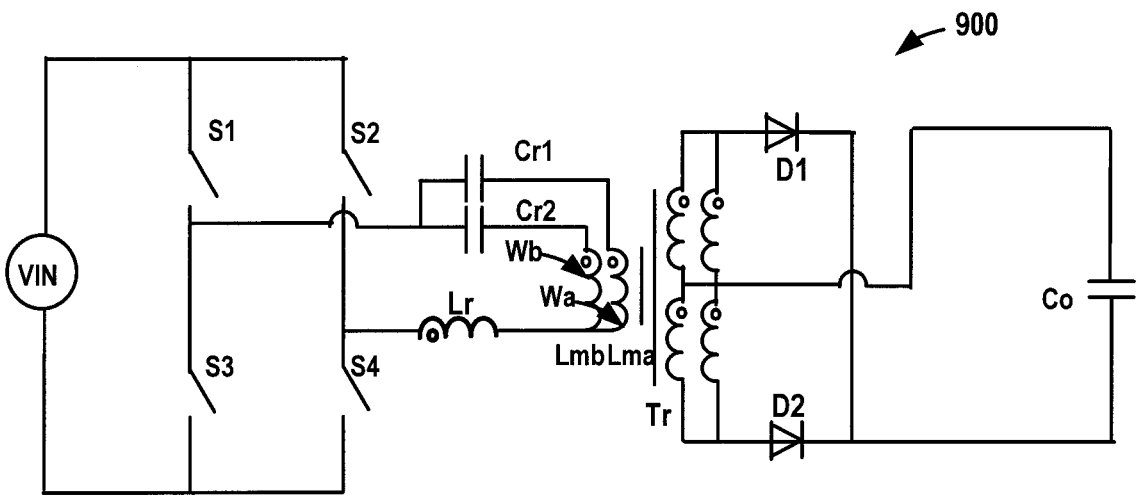
FIG. 9 illustrates a diagram of an example DC/DC converter with parallel windings according to another embodiment of the present disclosure.

FIG. 9 illustrates a diagram of an example DC/DC converter with parallel windings according to another embodiment of the present disclosure. In FIG. 9, the input conversion, the transformer and the output rectifying circuit are similar to those as illustrated in FIG. 8. A difference lies in that an LCC topology is used in the DC/DC converter 900 and that the output filtering circuit contains only a capacitor Co. The DC/DC converter 900 further contains an inductor Lr, and capacitors Cr1 and Cr2 for reducing the power circulation, which function together as the capacitor for forming the LLC topology. In other words, the inductor Lr, the magnetizing inductors Lma and Lmb and capacitors Cr1 and Cr2 serially connected thereto form an LLC circuit.

Figure 10:
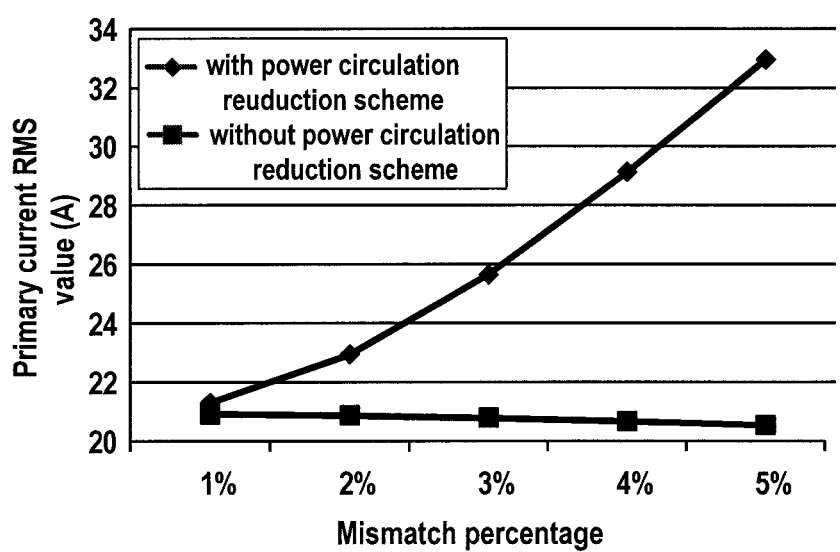
FIG. 10 illustrates a diagram of primary current RMS value comparison between the solution with power circulation reduction scheme as proposed herein and a solution without the power circulation reduction scheme.

FIG. 10 illustrates a diagram of primary current RMS value comparison between the solution with the power circulation reduction scheme as described with reference to FIG. 8 or 9 and an existing solution without the power circulation reduction scheme. The line with small diamond blocks indicates primary current RMS values with the power circulation reduction scheme, which is obtained from the DC/DC converter as illustrated in FIG. 9 and the other line with small square blocks indicates primary current RMS values without the power circulation reduction scheme, which are obtained from a traditional DC/DC. From FIG. 10, it is clear that the primary current RMS values can be kept low with the increasing of the mismatch according to the solution as proposed in the present disclosure; while in the existing solution, it increases substantially with the increasing of the mismatch. Therefore, it can achieve a good power circulation elimination effect and provide better efficiency performance.

It can be understood that although the present disclosure has been described mainly with reference to example embodiments of the present disclosure, however the present disclosure is not limited thereto. For example, in the present disclosure, ideas and principles described herein, especially those described with reference to FIGS. 8 to 10, are not limited to the DC/DC converter. The present disclosure can be used in any power converter, particularly with at least two parallel windings for the primary, wherein the secondary may or may not use the parallel windings. The present disclosure can also be used in any power converter with an input conversion circuit using any other structure instead of a bridge circuit. In addition, it is also possible to serially connect more than one capacitor for each of parallel windings. It may be possible to serially connect only part (at least two) of the parallel windings with capacitors in a case that there are three or more parallel windings. However it can be understood that it is preferable that each of the parallel windings is serially connect to a capacitor, since in such a case, a better power circulation reduction effect may be achieved.

Moreover, it shall also be understood that the ideas and principles described with reference to FIGS. 3 to 7 can be combined with those described with reference to FIGS. 8 to 10 to obtain combined advantages. For example, in the embodiment as described with reference to FIG. 3, when the primary of the transformer includes at least two parallel windings, there may also be a mismatch possibility among the parallel windings. In such a case, the converter 300 may further comprise at least two additional capacitors. The at least two parallel windings may be connected respectively in series to different capacitors of the at least two additional capacitors. Preferably, the capacitor Cr can be omitted and the at least two additional capacitors can function as the capacitor for forming the LLC topology.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A power converter, comprising: a transformer with a primary and a secondary; a capacitor and an inductor that are serially connected with the primary of the transformer, wherein the capacitor, the inductor and a magnetizing inductor of the primary of the transformer form an Inductor-Inductor-Capacitor, LLC, resonant circuit; a first current sensor comprising the inductor and configured to sense, via the inductor, a current passing through the primary of the transformer; a second current sensor comprising the primary and configured to sense, via the primary, a current passing through the magnetizing inductor of the transformer; a first integrator configured to integrate the sensed current passing through the primary of the transformer to obtain a first integrated current signal; a second integrator configured to integrate the sensed current passing through the magnetizing inductor of the transformer to obtain a second integrated current signal; and a difference determining element configured to determine a difference between the first integrated current signal and the second integrated current signal so that a signal characterizing a current passing through the secondary of the transformer can be obtained based on the determined difference, wherein the signal characterizing the current passing through the secondary is determined from the difference obtained based on the sensed current passing through the primary of the transformer and the sensed current passing through the magnetizing inductor.

2. The power converter of claim 1, wherein an output terminal of the second integrator is connected to a reference terminal of the first integrator so that the first integrator provides a difference between the first integrated current signal and the second integrated current signal.

3. The power converter of claim 1, further comprising: a rectifier for rectifying the difference between the first integrated current signal and the second integrated current signal.

4. The power converter of claim 1, wherein
the primary includes at least a first winding and a second winding connected in parallel; and
the first winding is serially connected with a first capacitor and the second winding is serially connected with a second capacitor.

5. The power converter of claim 4, wherein the first capacitor and the second capacitor function together as the capacitor for forming the LLC resonant circuit.

6. The power converter of claim 1, wherein the power converter is a Direct Current to Direct Current (DC/DC) converter; and the power converter further comprises a bridge circuit connected to the serially connected capacitor, the inductor and the primary of the transformer, an output rectifying circuit connected to the secondary of the transformer and an output filtering circuit.

* * * * *